United States Patent [19]
Hayward

[11] Patent Number: 5,357,655
[45] Date of Patent: Oct. 25, 1994

[54] FIXING TIE

[76] Inventor: Philip F. Hayward, 47 Firbank, Euxton, Chorley, Lancashire, United Kingdom, PR7 6HP

[21] Appl. No.: 4,455

[22] Filed: Jan. 14, 1993

[51] Int. Cl.$^5$ .............................................. B65D 63/00
[52] U.S. Cl. ........................................ 24/68 R; 24/19; 24/20 TT
[58] Field of Search ........... 24/68 R, 71 J, 19, 20 TT, 24/20 W, 23 W, 656, 653, 281, 284, 280

[56] References Cited

U.S. PATENT DOCUMENTS

| | | | |
|---|---|---|---|
| 1,271,129 | 7/1918 | Brooks | 24/23 W |
| 1,684,666 | 9/1928 | Frazier | 24/280 |
| 3,407,448 | 10/1968 | Tetzlaff et al. | 24/19 |
| 4,312,525 | 1/1982 | Kleykamp | 24/20 TT |
| 4,567,626 | 2/1986 | Kimbrough | 24/23 W |
| 4,675,949 | 6/1987 | DaCosta | 24/280 |

FOREIGN PATENT DOCUMENTS

| | | | |
|---|---|---|---|
| 1576028 | 7/1969 | France | 24/19 |
| 2123505 | 2/1984 | United Kingdom | 24/19 |

Primary Examiner—Victor N. Sakran
Attorney, Agent, or Firm—Pearson & Pearson

[57] ABSTRACT

A fixing tie (10) for use in securing the ends of a protective gaiter around a constant velocity joint comprises a flexible plastics strap (11) and an adjustment clip (12). The flexible strap (11) is passed round the end of the gaiter and the free ends pass through an aperture (23) into the clip. One end (27) of the strap (11) is secured in the clip by crimping of integral tabs (17) into contact with the strap. The other end (28) of the strap is received in a split pin (22) which is rotated in a mounting (21) to tighten the strap around the gaiter end. The other end (28) is then secured in position once again by crimping of further integral tabs (18) into contact with the strap and the split pin (22) is removed.

5 Claims, 5 Drawing Sheets

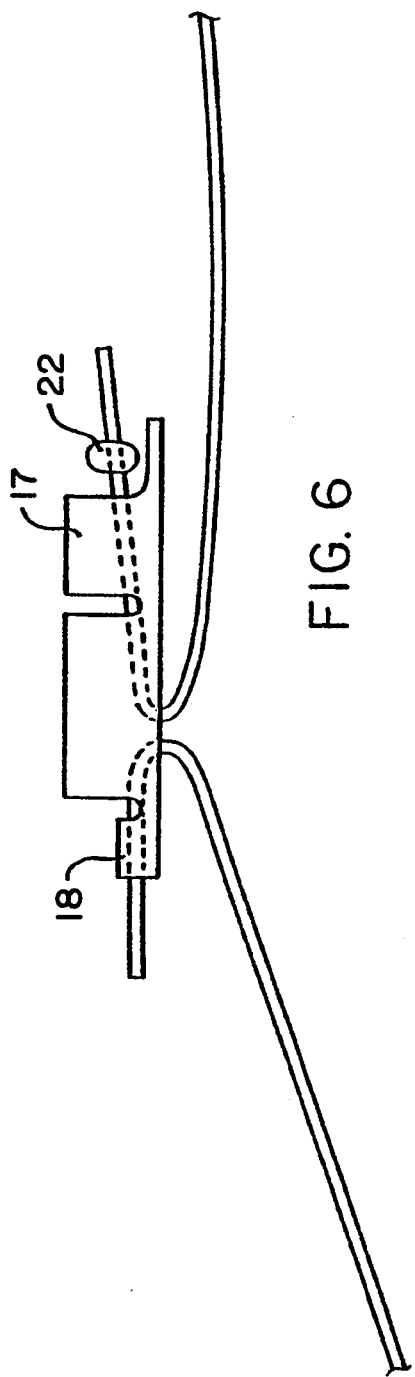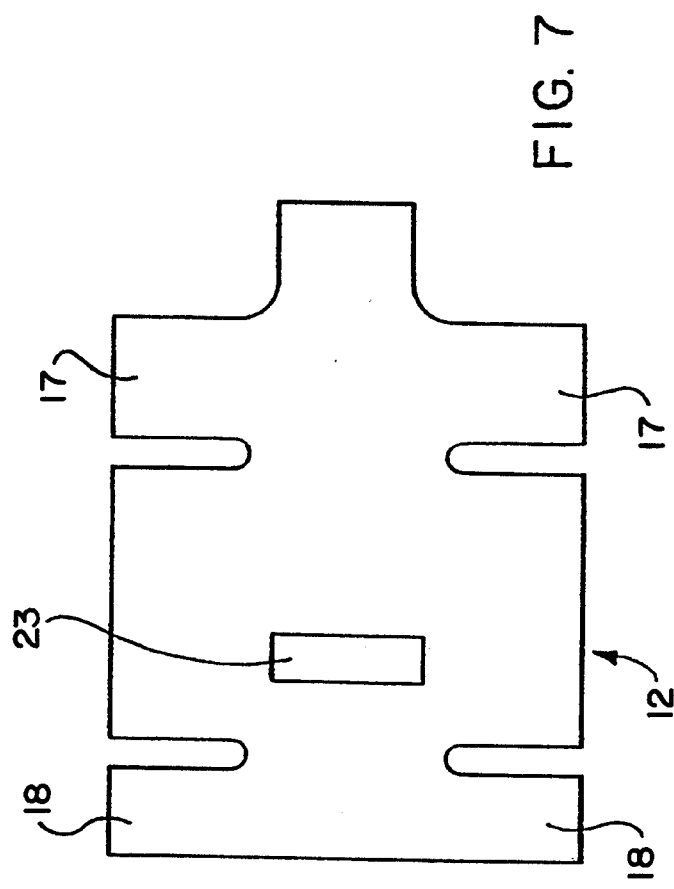

FIXING TIE

This invention relates to a fixing tie and more particularly to a fixing tie for securing the ends of a protective gaiter around a constant velocity joint.

With conventional fixing ties for this purpose it is found that the ties are expensive to produce, in so far as they are commonly made from a moulded plastics or pressed steel material, and can be of such dimensions that their applications are restricted to circumstances in which there is sufficient space to accommodate them. Furthermore, conventional ties can require special tools and/or expertise to use them effectively, can have very limited capability for adjustment, and are commonly of limited strength, thereby restricting their uses.

It is an object of the present invention to provide a simple and inexpensive fixing tie which overcomes or at least minimises the abovementioned problems and thus can be utilised in any circumstances when such a tie is required, thereby rendering the tie "universal" in application.

According to the present invention therefore there is provided a fixing tie comprising a flexible fixing strap and adjustment clip means, said adjustment clip means being shaped to define a mounting in which a tightening pin adapted to receive said strap can be mounted for rotation thereby to tighten said strap, said clip further being provided with retention means capable of being moved into a position whereby said strap can be retained in position in said clip when tightened.

With this arrangement it is possible to provide a fixing tie which is inexpensive to produce, versatile in use and can be utilised in a simple and effecient manner without the use of specialised tools or expertise.

The invention will now be described further by way of example only and with reference to the accompanying drawings of which:

FIG. 6 is a schematic side view of an alternative embodiment of fixing tie according to the invention; and FIG. 7 is a plan view of a disassembled clip of the tie of FIG. 6.

Figure 1:
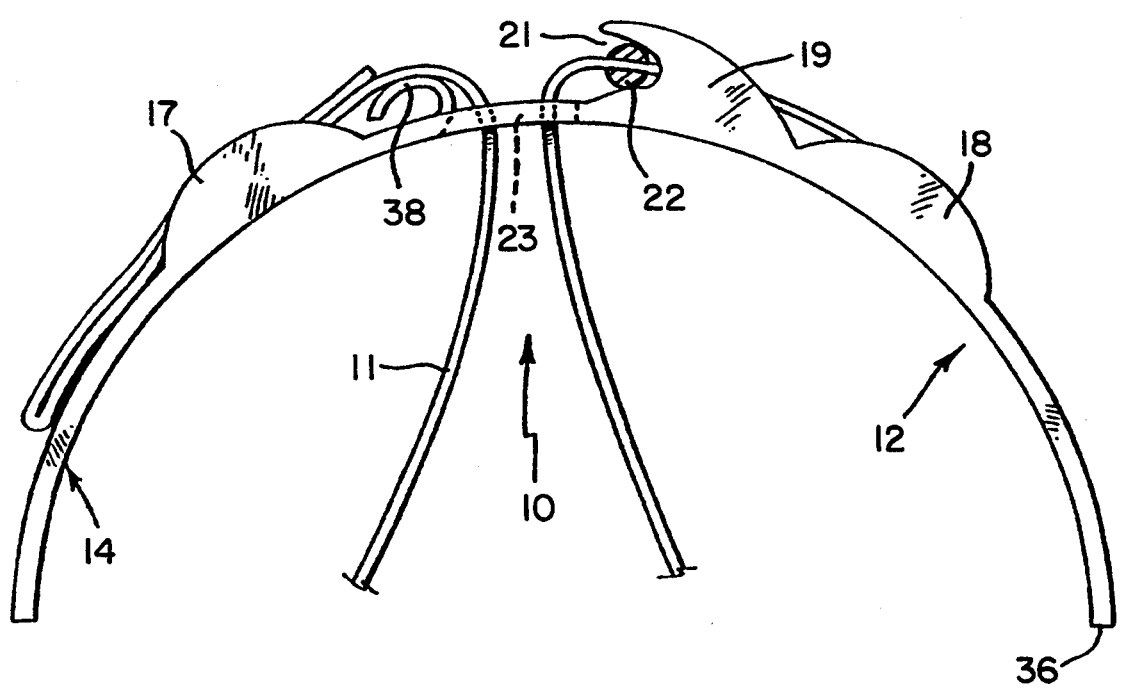
FIG. 1 is a side view of one embodiment of fixing tie according to the invention.
Figure 2:
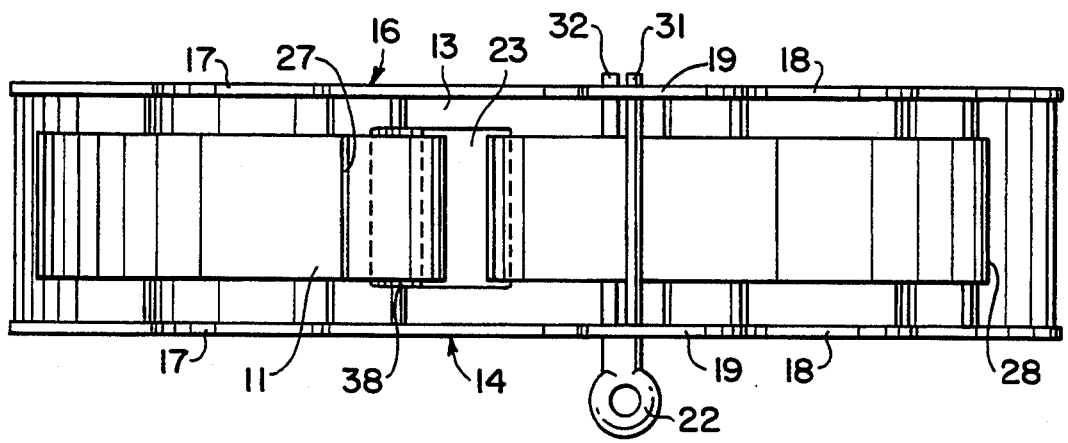
FIG. 2 is a plan view of the tie of FIG. 1 in use.

Referring now to the figures, there is shown in FIG. 1 a fixing tie 10 comprising a flexible fixing strap 11 which can be adjusted and secured by way of an adjustable clip 12.

The fixing strap 11 is a conventional generally elongate strap formed from a metal or plastics material, for example polypropylene, nylon or polyester material which has a relatively large strength in its longitudinal direction.

The adjustment clip 12 comprises an elongate generally semi-circularly shaped member which is formed from mild steel or plastics material or any other material as desired or as appropriate. It is envisaged that the material from which the clip 12 is formed will be such as to allow the clip 12 to have at least limited flexibility so that, in use, the clip 12 can be flexed to fit differently dimensioned gaiters and constant velocity joints. Of course alternatively, the clip can be generally planar and can be of such resilience and flexibility as to allow it to be bent to conform to any shape of joint.

The adjustment clip 12 has a base 13 along which, in use, the strap 11 can extend and upstanding shaped side walls 14, 16 for a purpose to be hereinafter described. The side walls 14, 16 are generally similar in configuration and are shaped to define two pairs 17, 18 of substantially semi-circular retention tabs and a pair of pin mounting members 19. Of course, the retention tabs 17, 18 can be of any configuration as desired or as appropriate. The base 13 of the clip 12 is provided with a number of raised areas of generally semi-circular cross-section for a purpose to be described hereinafter.

The pin mounting members 19 are shaped so as to define a generally semi-circular recess 21 in which a pin can be mounted for turning in a manner to be described hereinafter.

An aperture 23 is provided in the base member through which, in use, the flexible strap 11 can extend into the clip 12. The aperture 23 can be of any configuration as desired or as appropriate and in the embodiment shown in the drawings is substantially rectangular. It is envisaged that the aperture 23 will be stamped out of the material forming the base 13 of the clip 12 and therefore the material can be stamped out so as to leave the material connected to the base 13 of the clip 12 on at least a minor portion of the aperture 23 thereby enabling this material to be rolled back over itself into the configuration shown at 38 in the drawings. This rolled back portion provides a smooth surface over which the strap 11 can extend thereby preventing any severing of the strap 11 by the cut edge of the aperture 23.

Figure 4:
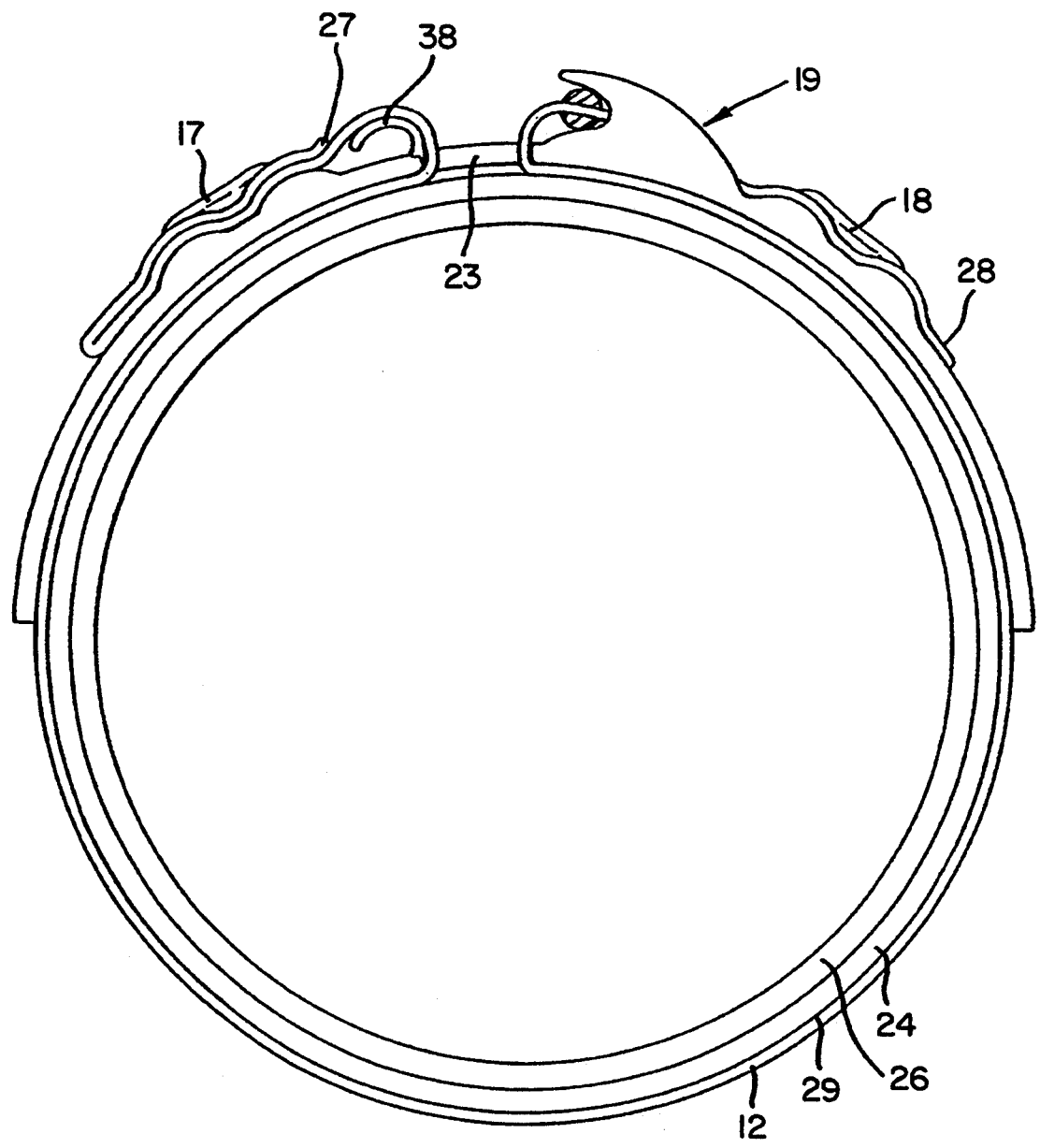
FIG. 4 is a side view showing the tie of FIG. 1 in use clamping the end of a protective gaiter to a constant velocity joint.

In use, if the fixing tie 10 is being used to secure an end of a protection gaiter for a constant velocity joint in position, for example of a motor car, as is shown in FIG. 4, an end of the gaiter is located over one end 26 of the joint and is secured in position as follows.

Figure 3:
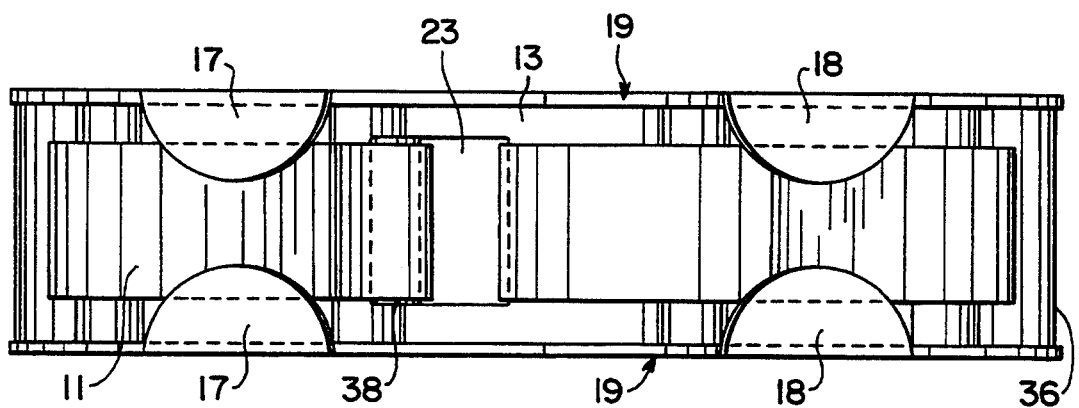
FIG. 3 is a plan view of the tie of FIG. 2 when tightened and in position.

The tie 10 is first assembled by passing a first end 27 of the flexible strap 11 through the aperture 23 in the base 13 of the clip 12, folding the end 27 back on itself and securing the end of the strap 11 in position in the clip 12 by bending the pair of tabs 17 inwardly into contact with the strap by crimping, as is shown more clearly in FIG. 3. Furthermore, it can be seen from FIG. 3 that the tabs 17 are crimped into contact with the strap 11 between the raised areas of the base 13 of the clip 12 which increases the gripping of the strap 11 by the clip thereby increasing the strength of attachment of the strap 11 to the clip 12 and therefore the longitudinal strength of the tie 10.

The tie 10 is then secured around the circumferential edge 29 of the gaiter end by passing the free end 28 of the flexible strap 11 around the edge 29 and then passing the free end 28 through the aperture 23 in the base of the clip 12. The free end 28 is then passed through the legs 31, 32 of a split pin 22 which, as mentioned above, is mounted for rotation in the recesses 21 of the mounting members 19.

The flexible strap 11 can now be tightened around the end of the gaiter 24, thereby securing the end to the constant velocity joint 26 by clockwise rotation of the pin 22. Once the strap 11 is tight enough to securely fix the end of the gaiter 24 onto the joint 26 the free end 28 of the strap is fixed in position in the clip 12 by crimping the other pair of tabs 18 into contact therewith between the raised areas of the base. The pin can now be removed from the clip, if desired, by a simple pulling movement, leaving the tie as shown in FIGS. 3 and 4. If desired, of course, the pin mounting members 19 can also be crimped into contact with the strap to improve the strength of retention of the strap by the clip.

Figure 5:
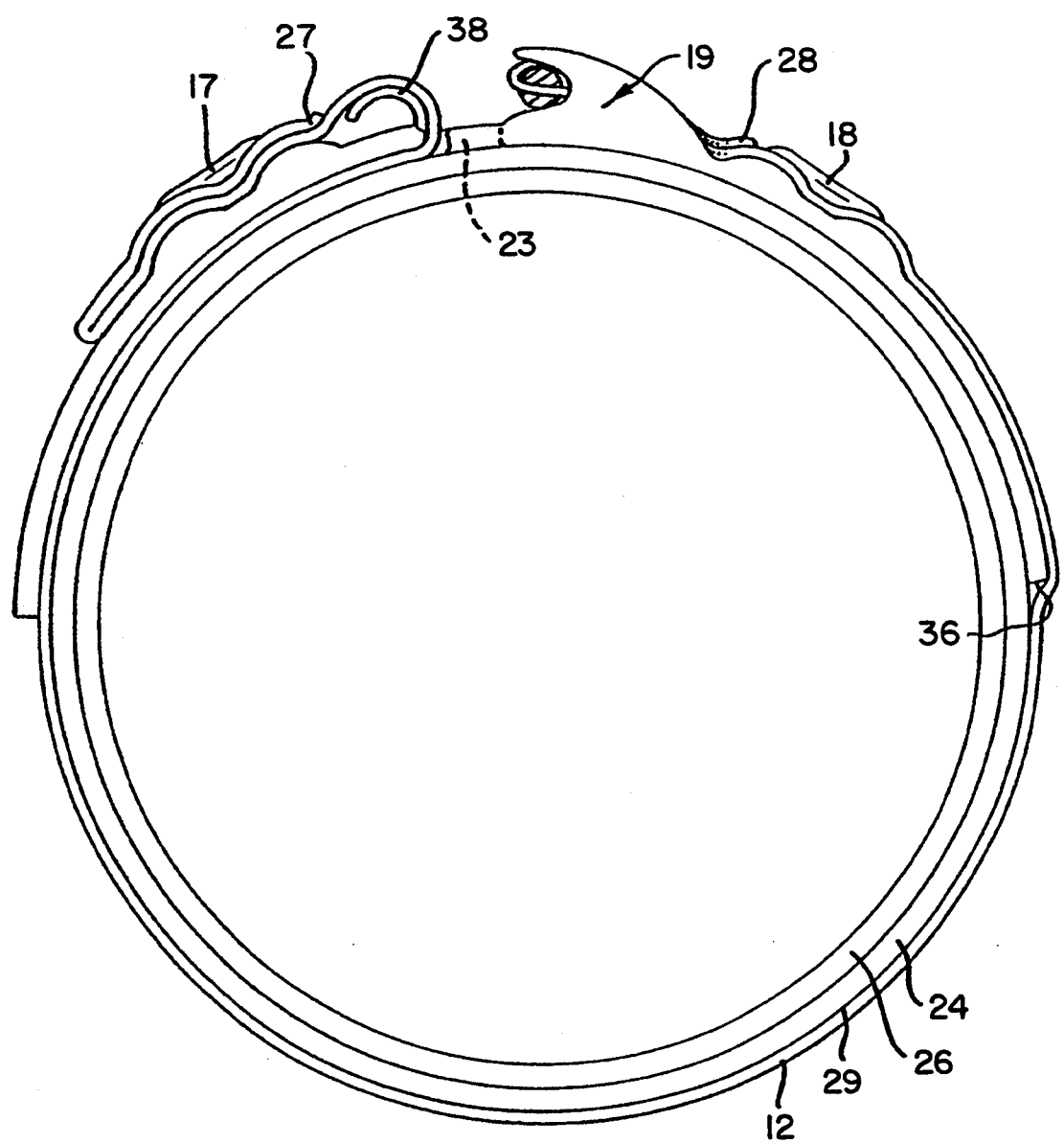
FIG. 5 is a side view showing the tie of FIG. 1 in use clamping the end of a protective gaiter to a constant velocity joint in a different manner to shown in FIG. 4.

Alternatively, as is shown in FIG. 5, the tie 10 can be secured around the circumferential edge of the gaiter end 24 by passing the free end 28 of the flexible strap 11 around the edge 29 and then passing the free end 28 over the end 36 of the clip, under the split pin shank 22 and then folded back on itself through the legs 31, 32 of the split pin. The flexible strap 11 can now be tightened as above and the end 28 can be fixed in position once again by crimping with the tabs 18 between the raised areas on the base 13 of the clip 12.

FIG. 6 shows an alternative form of tie according to the invention which operates in the same way as the other embodiments of fixing ties herein described, the only difference being in the configuration of the tabs. FIG. 7 shows the clip of the tie of FIG. 6 before it is bent into its operational configuration.

Thus it will be appreciated that with these arrangement it is possible to provide a simple and inexpensive tie which can be fitted efficiently in an easy and convenient manner. Furthermore, since the tabs of the clip are crimped into contact with the fixing strap, the height of the clip compared to known clips is dramatically reduced, thereby increasing the circumstances in which the tie can be used and rendering the tie "universal" in application.

It is of course to be understood that the invention is not intended to be restricted to the details of the above embodiment which are described by way of example only.

I claim:

1. A fixing tie comprising a flexible fixing strap and adjustment clip means, said adjustment clip means being shaped to define a mounting in which a tightening pin which receives said strap can be mounted for rotation thereby to tighten the strap, said clip further being provided with one or more tabs formed integrally with the clip capable of being moved by bending or crimping into contact with the strap whereby said strap can be retained in position in said clip when tightened.

2. A fixing tie according to claim 1 wherein said tightening pin is split so as to define two legs and said strap is received between said two legs.

3. A fixing tie according to claim 1 wherein said tabs define a mounting for said tightening pin.

4. A fixing tie according to claim 3 wherein said retention tabs comprises a cut-out therein in which said tightening pin can be accommodated.

5. A fixing tie according to claim 1 wherein said clip means includes an aperture through which said strap passes into said clip, said aperture having material bent back from at least one edge thereof to form a smooth surface for said strap to pass over.

* * * * *